US012403712B2

(12) United States Patent
Akimoto et al.

(10) Patent No.: US 12,403,712 B2
(45) Date of Patent: Sep. 2, 2025

(54) HEAT-SENSITIVE RECORDING MATERIAL

(71) Applicant: OJI HOLDINGS CORPORATION, Tokyo (JP)

(72) Inventors: Shinya Akimoto, Tokyo (JP); Kentaro Morofuji, Tokyo (JP); Takashi Takemura, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 360 days.

(21) Appl. No.: 17/919,887

(22) PCT Filed: Apr. 21, 2021

(86) PCT No.: PCT/JP2021/016171
§ 371 (c)(1),
(2) Date: May 19, 2023

(87) PCT Pub. No.: WO2021/215470
PCT Pub. Date: Oct. 28, 2021

(65) Prior Publication Data

US 2023/0271444 A1 Aug. 31, 2023

(30) Foreign Application Priority Data

Apr. 23, 2020 (JP) ................................ 2020-076838
Nov. 27, 2020 (JP) ................................ 2020-197667

(51) Int. Cl.
*B41M 5/44* (2006.01)
*B41M 5/323* (2006.01)
*B41M 5/333* (2006.01)
*B41M 5/42* (2006.01)

(52) U.S. Cl.
CPC .............. *B41M 5/44* (2013.01); *B41M 5/323* (2013.01); *B41M 5/3336* (2013.01); *B41M 5/426* (2013.01); *B41M 2205/04* (2013.01); *B41M 2205/38* (2013.01)

(58) Field of Classification Search
CPC .... B41M 5/323; B41M 5/3336; B41M 5/426; B41M 5/44; B41M 2205/04; B41M 2205/38
See application file for complete search history.

(56) References Cited

U.S. PATENT DOCUMENTS

| | | | |
|---|---|---|---|
| 6,372,689 B1 | 4/2002 | Kuga et al. | |
| 2003/0125205 A1 | 7/2003 | Kaneko et al. | |
| 2005/0137088 A1 | 6/2005 | Hayakawa et al. | |
| 2016/0236496 A1* | 8/2016 | Morie | B41M 5/44 |
| 2021/0268821 A1* | 9/2021 | Sakamoto | B41M 5/323 |

FOREIGN PATENT DOCUMENTS

| | | | |
|---|---|---|---|
| CN | 101035684 | A | 9/2007 |
| CN | 101037521 | A | 9/2007 |
| CN | 102295896 | A | 12/2011 |
| CN | 102673212 | A | 9/2012 |
| CN | 105579241 | A | 5/2016 |
| CN | 107614277 | A | 1/2018 |
| JP | H05-000573 | A | 1/1993 |
| JP | 6-312575 | A | 11/1994 |
| JP | 10-264522 | A | 10/1998 |
| JP | 11-208114 | A | 8/1999 |
| JP | 3176693 | B2 | 6/2001 |
| JP | 2003-080846 | A | 3/2003 |
| JP | 2003-118234 | A | 4/2003 |
| JP | 2008-062537 | A | 3/2008 |
| JP | 4108380 | B2 | 6/2008 |
| JP | 2009-279943 | A | 12/2009 |
| JP | 2013-111497 | A | 6/2013 |
| JP | 5781885 | B2 | 9/2015 |
| WO | 2020/004558 | A1 | 1/2020 |

OTHER PUBLICATIONS

Office Action issued Mar. 22, 2024 in Chinese Application No. CN202180029944.X.
Extended European Search Report dated Sep. 18, 2023 in European Application No. 21793569.1.
Office Action dated Jul. 5, 2024, issued in Brazilian Application No. BR112022020860-0.
Office Action dated Jul. 19, 2024, issued in Chinese Application No. 202180029944.X.
Written Opinion for PCT/JP2021/016171 dated Jul. 13, 2021.
International Search Report for PCT/JP2021/016171 dated Jul. 13, 2021.
Office Action drafted on Apr. 18, 2023 and issued on Apr. 25, 2023 in Japanese Application No. 2020-076838.
Office Action drafted on Dec. 15, 2023 and issued on Jan. 9, 2024 in Japanese Application No. 2020-197667.
Office Action dated Nov. 1, 2024 in Chinese Application No. 202180029944.X.
Office Action issued Jun. 13, 205 in Chinese Patent Application No. 202180029944.X.

* cited by examiner

*Primary Examiner* — Gerard Higgins
(74) *Attorney, Agent, or Firm* — Sughrue Mion, PLLC

(57) ABSTRACT

There is disclosed a heat-sensitive recording material including an undercoat layer formed on one surface of a support and a heat-sensitive recording layer formed on the undercoat layer. The heat-sensitive recording layer contains a leuco dye and a coloring agent. The undercoat layer contains hollow particles and a binding resin. A maximum particle diameter (D100) of the hollow particles is 10 to 30 μm. A particle diameter (D50) of the hollow particles at cumulative 50 volume % is 4.0 to 15 μm. A ratio D100/D50 of the maximum particle diameter (D100) of the hollow particles to the particle diameter (D50) of the hollow particles at cumulative 50 volume % is 1.8 to 3.0. A volume percentage of the hollow particles having particle diameters of 2.0 μm or less is 1% or less.

13 Claims, No Drawings

HEAT-SENSITIVE RECORDING MATERIAL

TECHNICAL FIELD

The present invention relates to a heat-sensitive recording material using a color-developing reaction between a leuco dye and a coloring agent.

BACKGROUND ART

A heat-sensitive recording material that records a color-developed image using a heat color-developing reaction between a colorless or light-colored leuco dye and a phenol or an organic acid has been widely put to practical use. A color-developed image is formed simply by heating such a heat-sensitive recording material. Thus, the heat-sensitive recording material has advantages, for example, the heat-sensitive recording material makes it possible to make a recording device compact, to easily perform maintenance of a recording device, and to reduce noise. Therefore, these heat-sensitive recording materials are widely used as various information recording materials in issuing machines such as a label printer, automatic ticket machines, CDs, ATMs, order form output machines in restaurants and the like, and data output machines for scientific research machines.

As the heat-sensitive recording material is used for various applications, the heat-sensitive recording material is expected to have higher performance. That is, there are demands for quality, such as an image that is highly and clearly colored, and high image quality without occurrence of white spots (printing omission).

In order to meet such demands, many improvement techniques related to the heat-sensitive recording material have been developed. For example, there is a method of improving the sensitivity of the heat-sensitive recording material by incorporating hollow particles into an undercoat layer provided between a support and a heat-sensitive recording layer in the heat-sensitive recording material to improve the heat insulation properties of the undercoat layer.

As a technique for further improving the method of incorporating hollow particles into the undercoat layer, for example, Patent Document 1 discloses a heat-sensitive recording material using a mixture of filler A having particle diameters of 1 μm or less and a hollowness of 80% or less, and filler B having particle diameters of 3 to 10 μm and a hollowness of 80% or more.

However, in the heat-sensitive recording material described in Patent Document 1, since the particle diameters of the hollow particles are small and the heat insulation properties are insufficient, the print energy tends to diffuse, and there is room for improvement in the recording density. In addition, since the particle diameters of the hollow particles are small and the coating layer has a weak cushioning property, there is room for improvement in the print image quality.

Patent Document 2 discloses a heat-sensitive recording material using hollow particles in which the hollowness is 60 to 98%, the maximum particle diameter (D100) is 5.0 to 10.0 μM, and the ratio D100/D50 of the maximum particle diameter to the particle diameter (D50) at cumulative 50 volume % is 1.5 to 3.0. The proportion of hollow particles having particle diameters of 2 μm or less contained in the hollow particles of Patent Document 2 is 2.2 to 3.6 volume %.

However, in the heat-sensitive recording material described in Patent Document 2, since the maximum particle diameter (D100) of the hollow particles is as small as 5.0 to 10.0 μm and the heat insulation properties are insufficient, the print energy tends to diffuse, and there is room for improvement in the recording density.

In addition, Patent Document 3 discloses thermally expandable resin particles used in an undercoat layer, and discloses that preferably, unexpanded particles have an average particle diameter of 1 to 25 μm, the particles expand in volume by a factor of 10 to 50 times when heated, and the hollowness is 80% or more.

However, in the heat-sensitive recording material described in Patent Document 3, since there is no viewpoint of making the particle diameters of the thermally expandable resin particles uniform, and the smoothness of the surface of the undercoat layer is reduced due to variations in the particle diameter after foaming, there is room for improvement in the image quality.

PATENT DOCUMENTS

[Patent Document 1] Japanese Patent No. 3176693
[Patent Document 2] Japanese Patent No. 4108380
[Patent Document 3] Japanese Patent No. 5781885

SUMMARY OF THE INVENTION

A main object of the present invention is to provide a heat-sensitive recording material which has high sensitivity and is excellent in halftone printing density, and can display a clear printed image with less printing omission and high image quality. In addition, a main object of the present invention is to provide a heat-sensitive recording material which is excellent in halftone printing density, can display a clear printed image with less printing omission and high image quality, and has an excellent coating surface strength.

The inventors conducted extensive studies in order to address the above problems, and as a result, found that the above problems can be addressed when the particle diameter and the particle diameter distribution are set to be within predetermined ranges, foamed type hollow particles with a reduced proportion of ultrafine particles are used, or the hollow particles and an inorganic pigment are mixed, and completed the present invention. That is, the present invention relates to the following heat-sensitive recording material.

Item 1. A heat-sensitive recording material including an undercoat layer formed on one surface of a support and a heat-sensitive recording layer formed on the undercoat layer, wherein the heat-sensitive recording layer contains a leuco dye and a coloring agent, the undercoat layer contains hollow particles and a binding resin, a maximum particle diameter (D100) of the hollow particles is 10 to 30 μm, a particle diameter (D50) of the hollow particles at cumulative 50 volume % is 4.0 to 15 μm, a ratio D100/D50 of the maximum particle diameter (D100) of the hollow particles to the particle diameter (D50) of the hollow particles at cumulative 50 volume % is 1.8 to 3.0, and a volume percentage of the hollow particles having particle diameters of 2.0 μm or less is 1% or less.

Item 2. The heat-sensitive recording material according to Item 1, wherein a content of the hollow particles with respect to a total solid content of the undercoat layer is 5 to 40 mass %.

Item 3. The heat-sensitive recording material according to Item 1 or 2, wherein a hollowness of the hollow particles is 80 to 98%.

Item 4. The heat-sensitive recording material according to any one of Items 1 to 3, wherein a coating amount of the undercoat layer after drying is 2.0 to 10 g/$m^2$.

Item 5. The heat-sensitive recording material according to any one of Items 1 to 4, wherein the coloring agent contains 4-hydroxy-4'-n-propoxydiphenylsulfone or N-[2-(3-phenylureido)phenyl]benzenesulfonamide.

Item 6. The heat-sensitive recording material according to any one of Items 1 to 5, wherein the undercoat layer further contains an inorganic pigment.

Item 7. The heat-sensitive recording material according to Item 6, wherein an oil absorption of the inorganic pigment (measurement method: JIS K-5101) is 90 ml/100 g or more.

Item 8. The heat-sensitive recording material according to Item 6 or 7, wherein a content of the inorganic pigment with respect to a total solid content of the undercoat layer is 20 to 70 mass %.

Item 9. The heat-sensitive recording material according to Item 8, wherein the content of the inorganic pigment with respect to the total solid content of the undercoat layer is 40 to 60 mass %.

Item 10. The heat-sensitive recording material according to any one of Items 6 to 9, wherein fired kaolin and/or silica is contained as the inorganic pigment.

Item 11. The heat-sensitive recording material according to any one of Items 1 to 10, wherein a latex is contained as the binding resin.

Item 12. The heat-sensitive recording material according to any one of Items 1 to 11, wherein a binding resin having a glass transition temperature of −10° C. or lower is contained as the binding resin.

Item 13. The heat-sensitive recording material according to any one of Items 1 to 12, wherein a binding resin having a glass transition temperature of −30° C. or lower is contained as the binding resin.

Item 14. The heat-sensitive recording material according to any one of Items 1 to 13, wherein at least a styrene-butadiene-based latex is contained as the binding resin.

Item 15. The heat-sensitive recording material according to Item 14, wherein the glass transition temperature of the styrene-butadiene-based latex is −10° C. or lower.

Item 16. The heat-sensitive recording material according to Item 15, wherein the glass transition temperature of the styrene-butadiene-based latex is −30° C. or lower.

Item 17. The heat-sensitive recording material according to any one of Items 1 to 16, wherein a hollowness of the hollow particles is 91 to 98%.

Item 18. The heat-sensitive recording material according to any one of Items 1 to 17, wherein a content of the hollow particles with respect to a total solid content of the undercoat layer is 5 to 30 mass %.

Item 19. The heat-sensitive recording material according to any one of Items 1 to 18, wherein a coating amount of the undercoat layer after drying is 3.0 to 10 g/$m^2$.

Item 20. A heat-sensitive recording material including an undercoat layer formed on one surface of a support and a heat-sensitive recording layer formed on the undercoat layer, wherein the heat-sensitive recording layer contains a leuco dye and a coloring agent, the undercoat layer contains hollow particles, an inorganic pigment and a binding resin, a maximum particle diameter (D100) of the hollow particles is 10 to 30 μm, a particle diameter (D50) of the hollow particles at cumulative 50 volume % is 4.0 to 15 μm, a ratio D100/D50 of the maximum particle diameter (D100) of the hollow particles to the particle diameter (D50) of the hollow particles at cumulative 50 volume % is 1.8 to 3.0, a hollowness of the hollow particles is 80 to 98%, and a volume percentage of the hollow particles having particle diameters of 2.0 μm or less is 1% or less.

Item 21. The heat-sensitive recording material according to Item 20, wherein an oil absorption of the inorganic pigment (measurement method: JIS K-5101) is 90 ml/100 g or more.

Item 22. The heat-sensitive recording material according to Item 20 or 21, wherein the hollowness of the hollow particles is 91 to 98%.

Item 23. The heat-sensitive recording material according to any one of Items 20 to 22, wherein a content of the hollow particles with respect to a total solid content of the undercoat layer is 5 to 30 mass %.

Item 24. The heat-sensitive recording material according to any one of Items 20 to 23, wherein a coating amount of the undercoat layer after drying is 3.0 to 10 g/$m^2$.

Item 25. The heat-sensitive recording material according to any one of Items 20 to 24, wherein a content of the inorganic pigment with respect to a total solid content of the undercoat layer is 20 to 70 mass %.

Item 26. The heat-sensitive recording material according to Item 25, wherein the content of the inorganic pigment with respect to the total solid content of the undercoat layer is 40 to 60 mass %.

Item 27. The heat-sensitive recording material according to any one of Items 20 to 26, wherein fired kaolin and/or silica is contained as the inorganic pigment.

Item 28. The heat-sensitive recording material according to any one of Items 20 to 27, wherein at least a styrene-butadiene-based latex is contained as the binding resin.

Item 29. The heat-sensitive recording material according to Item 28, wherein a glass transition temperature of the styrene-butadiene-based latex is −10° C. or lower.

Item 30. The heat-sensitive recording material according to Item 29, wherein the glass transition temperature of the styrene-butadiene-based latex is −30° C. or lower.

The heat-sensitive recording material of the present invention has high sensitivity and is excellent in halftone printing density, and can display a clear printed image with less printing omission and high image quality. In addition, the heat-sensitive recording material of the present invention has an excellent halftone printing density, can display a clear printed image with less printing omission and high image quality, and has an excellent coating surface strength.

MODES FOR CARRYING OUT THE INVENTION

In this specification, the expression "contain" is a concept including "include," "composed of substantially only," and "composed of only."

In this specification, when a numerical value range is indicated using "to," the range includes the numerical values stated before and after "to" as a lower limit value and an upper limit value.

The latex such as a styrene-butadiene-based latex in the present invention includes a form of a gel or dry film formed by drying a dispersion medium.

In addition, in the present invention, the "average particle diameter" means a volume-based median diameter measured by a laser diffraction method. More simply, particle diameters may be measured from a particle image (SEM image) using an electronic microscope, and an average value of 10 particle diameters may be used.

The present invention provides a heat-sensitive recording material including an undercoat layer formed on one surface of a support and a heat-sensitive recording layer formed on the undercoat layer. The heat-sensitive recording layer contains a leuco dye and a coloring agent, the undercoat layer contains hollow particles and a binding resin, a maximum particle diameter (D100) of the hollow particles is 10 to 30 μm, a particle diameter (D50) of the hollow particles at cumulative 50 volume % is 4.0 to 15 μm, the ratio D100/D50 of the maximum particle diameter (D100) of the hollow particles to the particle diameter (D50) of the hollow particles at cumulative 50 volume % is 1.8 to 3.0, and the volume percentage of the hollow particles having particle diameters of 2.0 μm or less is 1% or less.

[Support]

The kind, shape, size and the like of the support are not particularly limited, and for example, the support can be used by being appropriately selected from high-quality paper (acidic paper, neutral paper), medium-quality paper, coated paper, art paper, cast coated paper, glassine paper, resin-laminated paper, polyolefin synthetic paper, synthetic fiber paper, non-woven paper, a synthetic resin film and the like, and various transparent supports. The thickness of the support is not particularly limited, and is usually about 20 to 200 μm. In addition, the density of the support is not particularly limited, and is preferably about 0.60 to 0.85 $g/cm^3$.

[Undercoat Layer]

The undercoat layer is provided between the support and the heat-sensitive recording layer, and has a function of improving fixation of the heat-sensitive recording layer, a function of making an image of the heat-sensitive recording layer clear by reducing diffusion of heat applied to the heat-sensitive recording layer, and the like. The undercoat layer contains hollow particles and a binding resin or contains hollow particles, inorganic particles and a binding resin. The undercoat layer preferably further contains a thickener, and may contain, as necessary, an auxiliary agent or the like.

(Hollow Particles)

When hollow particles made of an organic resin are contained in the undercoat layer, it is possible to improve the heat insulation properties of the undercoat layer. The undercoat layer having high heat insulation properties can prevent diffusion of heat applied to the heat-sensitive recording layer whereby it is possible to increase the sensitivity of the heat-sensitive recording material.

Hollow particles made of an organic resin can be classified into a foamed type and a non-foamed type depending on the difference in the production method. In these two types, foamed type hollow particles have properties suitable for improving the heat insulation properties of the undercoat layer.

<Method of Producing Hollow Particles>

Hereinafter, a typical method of producing foam type hollow particles will be described.

Hollow particles can be produced by first preparing particles in which a volatile liquid is sealed in a resin, softening the resin by heating, and vaporizing and expanding the liquid inside the particles.

Since the internal liquid is heated and expanded in a production procedure, the hollowness of the foamed type hollow particles increases. Since high heat insulation properties are obtained due to the large hollowness, foamed type hollow particles can increase the sensitivity of heat-sensitive paper and improve the recording density. An improvement in sensitivity is particularly important when a halftone region in which a low thermal energy is applied to the heat-sensitive recording layer is color-developed. In addition, if the heat-sensitive recording layer is formed via an undercoat layer having high heat insulation properties, it is possible to prevent diffusion of heat applied to the heat-sensitive recording layer, and thereby it is possible to prevent image bluffing, and improve the image quality.

Examples of resins that can be used for foamed type hollow particles include thermoplastic resins such as styrene-acrylic resins, polystyrene resins, acrylic resins, polyethylene resins, polypropylene resins, polyacetal resins, chlorinated polyether resins, polyvinyl chloride resins, polyvinylidene chloride resins, acrylic resins (for example, an acrylic resin containing acrylonitrile as a structural component), styrene resins, vinylidene chloride resins, and copolymer resins mainly composed of polyvinylidene chloride and acrylonitrile. Propane, butane, isobutane, air and the like are generally used as a gas contained in the foamed type hollow particles. Regarding resins used for hollow particles, among the above various resins, in consideration of the strength to maintain the shape of foam particles, acrylonitrile resins and copolymer resins mainly composed of polyvinylidene chloride and acrylonitrile are preferable.

<Maximum Particle Diameter>

The maximum particle diameter of the hollow particles is 10 to 30 μM, preferably 10 to 25 μm, and more preferably 10 to 20 μm. Here, the maximum particle diameter is also called D100. When the maximum particle diameter of the hollow particles is 10 μm or more, since the cushioning property of the undercoat layer is improved, adhesion of heat-sensitive paper to a thermal head during printing is improved, and a high-image quality heat-sensitive recording material is obtained. Such a heat-sensitive recording material having high adhesion to a thermal head can improve the recording density in a halftone region in which the color is developed with an energy lower than the energy of the maximum recording density (Dmax). On the other hand, when the maximum particle diameter of the hollow particles is 30 μm or less, since the smoothness of the undercoat layer is improved, the heat-sensitive recording layer provided via the undercoat layer can be made uniform, a heat-sensitive recording material having a high color density can be obtained, and adhesiveness between the support and the undercoat layer is improved so that a heat-sensitive recording material having an excellent coating surface strength can be obtained. The maximum particle diameter of the hollow particles can be measured using a laser diffraction type particle size distribution measuring device. In addition, it is possible to actually measure the size using an electronic microscope.

<Median Diameter>

When powder particles are divided into two groups based on the particle diameters, the diameter at which volumes occupied by larger particles and smaller particles are the same, that is, the particle diameter at cumulative 50 volume %, is called a median diameter. The median diameter is also called D50. The median diameter of the hollow particles can be measured using a laser diffraction type particle size distribution measuring device. In addition, it is possible to actually measure the median diameter using an electronic microscope. The median diameter of the hollow particles is 4.0 to 15 μm, and preferably 7.5 to 15 μm. When the median diameter is set to 4.0 μm or more, it is possible to improve the cushioning property. On the other hand, when the median diameter is set to 15 μm or less, it is possible to improve the smoothness.

<Ratio Between Maximum Particle Diameter and Median Diameter>

The ratio (D100/D50) of the maximum particle diameter (D100) to the median diameter (D50) is an index indicating the degree of particle size distribution. The D100/D50 is 1.8 to 3.0, preferably 1.8 to 2.8, and more preferably 1.8 to 2.6. When D100/D50 is set to 1.8 or more, hollow particles are sufficiently foamed, the maximum particle diameter is sufficiently large, the hollowness is high, and the heat insulation properties of the undercoat layer can be improved. On the other hand, when D100/D50 is set to 3.0 or less, since the sizes of the hollow particles become uniform, it is possible to improve the smoothness of the undercoat layer, it is possible to reduce white spots in the image, and moreover, it is possible to improve the recording density.

<Hollow Particles Having Particle Diameters of 2 μm or Less>

In the particle size distribution obtained by a laser diffraction type particle size distribution measuring device, the volume percentage of hollow particles having particle diameters of 2.0 μM or less is 1% or less. In addition, the volume percentage of the hollow particles having particle diameters of 2.0 μm or less is preferably 0.5% or less, and more preferably, the hollow particles having particle diameters of 2.0 μm or less are not contained. It is thought that the hollow particles having particle diameters of 2 μm or less have a very small contribution to the heat insulation properties because the particle diameters are too small to provide a sufficient hollow region. When the volume percentage of the hollow particles having particle diameters of 2 μm or less in the undercoat layer is set to 1% or less, it is possible to improve the recording density, image quality and the like.

<Content>

The content of the hollow particles with respect to a total solid content of the undercoat layer is preferably 5 to 40 mass %, and more preferably 5 to 30 mass %. When the content of the hollow particles is 5 mass % or more, it is possible to improve the heat insulation properties of the undercoat layer. On the other hand, when the content of the hollow particles is 30 mass % or less, problems regarding the strength of the coating surface are less likely to occur.

<Hollowness>

The hollowness of the hollow particles is preferably 80 to 98%, more preferably 90 to 98%, and still more preferably 91 to 98%. When the hollowness of the hollow particles is 80% or more, high heat insulation properties can be imparted to the undercoat layer containing hollow particles, and the image quality can also be improved. On the other hand, when the hollowness of the hollow particles is 98% or less, the strength of the film surrounding the hollow portion is improved, and thus hollow particles that do not collapse when the undercoat layer is formed can be obtained.

(Inorganic Pigment)

When the inorganic pigment is contained in the undercoat layer, the smoothness is improved, and as a result, the image quality can be improved and the halftone printing density can also be increased. Various inorganic pigments can be used, and specific examples thereof include fired kaolin, silica, light calcium carbonate, and talc, and fired kaolin and silica are preferable. The average particle diameter of the primary particles of these inorganic pigments is preferably about 0.01 to 5 μm, and particularly about 0.02 to 3 μm.

The oil absorption of the inorganic pigment is preferably 90 ml/100 g or more and more preferably about 90 to 170 ml/100 g. Here, the oil absorption is a value obtained according to the method in JIS K 5101. When the oil absorption of the inorganic pigment is 90 ml/100 g or more, it is possible to improve the image quality and the halftone printing density. The content of the inorganic pigment can be selected from a wide range, but is generally preferably about 20 to 70 mass % and more preferably about 40 to 60 mass % with respect to a total solid content of the undercoat layer. When the content of the inorganic pigment is 20 mass % or more, it is possible to improve the image quality and the halftone printing density. On the other hand, when the content of the inorganic pigment is 70 mass % or less, problems regarding the strength of the coating surface are less likely to occur. In addition, the content of fired kaolin with respect to a total solid content of the undercoat layer is preferably 5 to 80 mass %.

(Thickener)

When the thickener is contained in the undercoat layer, it is possible to prevent unevenness of the hollow particles in an undercoat layer coating liquid. Regarding the thickener, various known materials, for example, cellulose and its derivatives, high-molecular-weight polysaccharides, modified polyacrylic acid, sodium alginate, and maleic anhydride copolymers can be appropriately used. Among the above materials, cellulose derivatives such as carboxymethyl cellulose (CMC) and high-molecular-weight polysaccharides are preferable as the material used for the thickener.

Since the maximum particle diameter of the hollow particles is large, the hollow particles have a large buoyant force and tend to gather upward in a liquid having a low viscosity. Cellulose derivatives and high-molecular-weight polysaccharides are preferably used as a thickener of the undercoat layer coating liquid because the hollow particles are less likely to float in the undercoat layer coating liquid and uneven distribution of the hollow particles in the undercoat layer is reduced. When the uneven distribution of the hollow particles is reduced, since the smoothness of the undercoat layer is improved, the heat-sensitive recording layer provided via the undercoat layer can be made uniform, white spots and the like in the image can be reduced, and the maximum color density is also improved. The content of the thickener is not particularly limited, and is preferably in a range of about 1 to 5 mass % with respect to a total solid content of the undercoat layer. When the content is 1 mass % or more, floating of the hollow particles is suppressed, and the maximum color density is excellently improved. When the content is 5 mass % or less, an increase in the viscosity of the paint is suppressed and coatability is excellent.

(Binding Resin)

The undercoat layer may contain a binding resin (binder). As the binder used in the undercoat layer coating liquid, for example, water-based adhesives such as water-soluble adhesives and water-dispersible adhesives can be used. Examples of water-soluble adhesives include modified-polyvinyl alcohols such as polyvinyl alcohol, carboxy-modified polyvinyl alcohol, acetoacetyl-modified polyvinyl alcohol, diacetone-modified polyvinyl alcohol, and silicon-modified polyvinyl alcohol, starch and its derivatives, cellulose derivatives such as methoxy cellulose, carboxymethyl cellulose, hydroxyethyl cellulose, hydroxypropyl methylcellulose, methylcellulose, and ethyl cellulose, sodium polyacrylate, polyvinylpyrrolidone, polyamide, diisobutylene-maleic anhydride copolymer salts, styrene-acrylic acid copolymer salts, styrene-maleic anhydride copolymer salts, ethylene-maleic anhydride copolymer salts, acrylamide-acrylic acid ester copolymers, acrylamide-acrylic acid ester-methacrylic acid copolymers, polyacrylamide, sodium alginate, gelatin, casein, and gum arabic. Examples of water-dispersible adhesives include emulsions of polyvinyl acetate, polyurethane, polyacrylic acid, polyacrylic acid ester, vinyl chloride-vinyl acetate copolymers, polybutyl methacrylate, ethylene-vinyl acetate copolymers or the like, and latexes of water-insoluble polymers such as styrene-butadiene copolymers and styrene-butadiene-acrylic copolymers. Each of them may be used alone or two or more of them may be used in combination.

The undercoat layer preferably contains a binding resin having a glass transition temperature (Tg) of −10° C. or lower, and more preferably contains a binding resin having a glass transition temperature of −30° C. or lower. When the binding resin having a glass transition temperature of −10° C. or lower is contained, the flexibility of the coating layer can be improved, the cushioning property can be improved, and the image quality of the heat-sensitive recording material can be further improved.

The binding resin of the undercoat layer preferably contains latex having an excellent surface strength. The latex is not particularly limited, and examples thereof include latexes of water-insoluble polymers such as styrene-butadiene copolymers, styrene-butadiene-acrylonitrile copolymers, and acrylonitrile-butadiene copolymers. Among these latexes, styrene-butadiene-based latex (SBR) is preferable because it has a high water resistant surface strength. Among styrene-butadiene-based latexes, a styrene-butadiene-based latex having a glass transition temperature of −10° C. or lower is preferable. When the glass transition temperature is −10° C. or lower, it is possible to improve the image quality and increase the halftone printing density. The glass transition temperature of the styrene-butadiene-based latex is more preferably −30° C. or lower because this can further increase the halftone printing density. In addition, the glass transition temperature is preferably −50° C. or higher.

The content of the binding resin in the undercoat layer is preferably about 1 to 60 mass %, and more preferably about 5 to 40 mass %. When the content of the binding resin is within the above range, the coatability is favorable when the undercoat layer is coated. In addition, in the binding resin, the content of the water-soluble polymer is preferably about 1 to 50 mass % and more preferably about 5 to 30 mass %.

(Application of Undercoat Layer Coating Liquid)

The undercoat layer is formed by applying an undercoat layer coating liquid onto a support and then drying it. The undercoat layer coating liquid is prepared by mixing and stirring materials for the undercoat layer such as the above hollow particles, inorganic pigment, and binding resin, and a solvent such as water. The coating amount of the undercoat layer coating liquid after drying is preferably about 2.0 to 10 $g/m^2$ and more preferably about 2.5 to 7.0 $g/m^2$. In addition, the coating amount of the undercoat layer coating liquid after drying is preferably about 2.5 to 11 $g/m^2$ and more preferably about 3.0 to 10 $g/m^2$. When the coating amount is 2.5 $g/m^2$ or more, it is possible to improve the heat insulation properties of the undercoat layer. On the other hand, when the coating amount is 11 $g/m^2$ or less, problems regarding the strength of the coating surface are less likely to occur.

[Heat-Sensitive Recording Layer]

The heat-sensitive recording layer is provided on the undercoat layer, and has a function of displaying and recording text, designs and the like since the heat-sensitive recording layer has such a property that a part to which heat is applied develops color. The heat-sensitive recording layer contains a leuco dye and a coloring agent, and may contain, as necessary, a preservation improving agent, a sensitizer, a binding resin, a cross-linking agent and the like.

(Leuco Dye)

The heat-sensitive recording layer generally contains a dye precursor and a coloring agent. Typical dye precursors are colorless or light-colored leuco dyes. Leuco dyes include triphenylmethane-based, fluorine-based, and diphenylmethane-based compounds, and can be appropriately selected and used. In addition, leuco dyes include dyes having color tones such as red, vermilion, magenta, blue, cyan, yellow, green, and black, and can be appropriately selected and used.

Examples of leuco dyes include blue chromogenic dyes such as 3,3-bis(p-dimethylaminophenyl)-6-dimethylaminophthalide, 3-(4-diethylamino-2-methylphenyl)-3-(4-dimethylaminophenyl)-6-dimethylaminophthalide, and fluorane, green chromogenic dyes such as 3-(N-ethyl-N-p-tolyl)amino-7-N-methylanilinofluorane, 3-diethylamino-7-anilinofluorane, and 3-diethylamino-7-dibenzylaminofluorane, red chromogenic dyes such as 3,6-bis(diethylamino)fluorane-γ-anilinolactam, 3-cyclohexylamino-6-chlorofluorane, 3-diethylamino-6-methyl-7-chlorofluorane, and 3-diethylamino-7-chlorofluorane, black chromogenic dyes such as 3-(N-ethyl-N-isoamyl)amino-6-methyl-7-anilinofluorane, 3-(N-methyl-N-cyclohexyl)amino-6-methyl-7-anilinofluorane, 3-diethylamino-6-methyl-7-anilinofluorane, 3-di(n-butyl)amino-6-methyl-7-anilinofluorane, 3-di(n-pentyl)amino-6-methyl-7-anilinofluorane, 3-diethylamino-7-(o-chlorophenylamino)fluorane, 3-(N-ethyl-p-toluidino)-6-methyl-7-anilinofluorane, 3-(N-ethyl-p-toluidino)-6-methyl-7-(p-toluidino)fluorane, 3-(N-ethyl-N-tetrahydrofurfurylamino)-6-methyl-7-anilinofluorane, 3-diethylamino-6-chloro-7-anilinofluorane, 3-dimethylamino-6-methyl-7-anilinofluorane, 3-pyrrolidino-6-methyl-7-anilinofluorane, 3-piperidino-6-methyl-7-anilinofluorane, 2,2-bis{4-[6'-(N-cyclohexyl-N-methylamino)-3'-methylspiro[phthalid-3,9'-xanthene]-2'-ylamino]phenyl}propane, and 3-diethylamino-7-(3'-trifluoromethylphenyl)aminofluorane, and dyes having an absorption wavelength in a near-infrared range such as 3,3-bis[1-(4-methoxyphenyl)-1-(4-dimethylaminophenyl)ethylene-2-yl]-4,5,6,7-tetrachlorophthalide, 3,3-bis[1-(4-methoxyphenyl)-1-(4-pyrrolidinophenyl)ethylene-2-yl]-4,5,6,7-tetrachlorophthalide, 3-p-(p-dimethylaminoanilino)anilino-6-methyl-7-chlorofluorane, 3-p-(p-chloroanilino)anilino-6-methyl-7-chlorofluorane, and 3,6-bis(dimethylamino)fluorene-9-spiro-3'-(6'-dimethylamino)phthalide. Naturally, the present invention is not limited thereto, and as necessary, two or more of them may be used in combination. Among these, 3-di(n-butyl)amino-6-methyl-7-anilinofluorane, 3-di(n-pentyl)amino-6-methyl-7-anilinofluorane, and 3-(N-ethyl-N-isoamylamino)-6-methyl-7-anilinofluorane are preferably used because they have excellent recording sensitivity and print preservation.

The content of the leuco dye with respect to a total solid content of the heat-sensitive recording layer is preferably about 5 to 30 mass %, more preferably about 7 to 30 mass %, and still more preferably about 7 to 25 mass %. When the content of the leuco dye is 5 mass % or more, it is possible to improve the color density. On the other hand, when the content of the leuco dye is 30 mass % or less, it is possible to improve the heat resistance. In addition, the content per unit area of the leuco dye in the heat-sensitive recording layer is preferably about 0.2 to 2.0 $g/m^2$, and more preferably about 0.4 to 1.5 $g/m^2$. The content per unit area of the leuco dye can be measured using a high-performance liquid chromatographic method or the like.

(Coloring Agent)

Specific examples of coloring agents include, for example, phenolic compounds such as 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-cyclohexylidenediphenyl, 4,4'-cyclohexylidene diphenol, 1,1-bis(4-hydroxyphenyl)-ethane, 1,1-bis(4-hydroxyphenyl)-1-phenylethane, 4,4'-bis (p-tolylsulfonylaminocarbonylamino)diphenylmethane, 1,1-bis(4-hydroxyphenyl)cyclohexane, 2,2'-bis[4-(4-hydroxyphenyl)phenoxy]diethyl ether, 4,4'-dihydroxydiphenyl sulfide, 4,4'-thiobis(3-methyl-6-tert-butylphenol), 4,4'-dihydroxydiphenyl sulfone, 2,4'-dihydroxydiphenylsulfone, 2,2-bis(4-hydroxyphenyl)-4-methylpentane, 2,4'-dihydroxydiphenylsulfone, 4-hydroxy-4'-isopropoxydiphenylsulfone, 4-hydroxy-4'-n-propoxydiphenylsulfone, 4-hydroxy-4'-allyloxydiphenylsulfone, 4-hydroxy-4'-benzyloxydiphenylsulfone, 3,3'-diallyl-4,4'-dihydroxydiphenylsulfone, bis (p-hydroxyphenyl)butyl acetate, methyl bis(p-hydroxyphenyl)acetate, hydroquinone monobenzyl ether, bis(3-allyl-4-hydroxyphenyl)sulfone, 4-hydroxy-4'-methyldiphenylsulfone, 4-allyloxy-4'-hydroxydiphenylsulfone, 3,4-dihydroxyphenyl-4'-methylphenylsulfone, 4-hydroxybenzophenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, 4-hydroxybenzoic acid benzyl ester, tolyl 4-hydroxybenzoate, chlorophenyl 4-hydroxybenzoate, and 4,4'-dihydroxydiphenyl ether, aromatic carboxylic acids such as benzoic acid, p-chlorobenzoic acid, p-tert-butylbenzoic acid, trichlorobenzoic acid, terephthalic acid, salicylic acid, 3-tert-butylsalicylic acid, 3-isopropylsalicylic acid, 3-benzylsalicylic acid, 3-(α-methylbenzyl)salicylic acid, 3,5-di-tert-butylsalicylic acid, 4-[2-(p-methoxyphenoxy) ethyloxy]salicylic acid, 4-[3-(p-tolylsulfonyl)propyloxy] salicylic acid, 5-[p-(2-p-methoxyphenoxyethoxy)cumyl] salicylic acid, and zinc 4-[3-(p-tolylsulfonyl)propyloxy] salicylate, and phenolic compounds thereof, organic acidic substances such as salts of aromatic carboxylic acids and polyvalent metals, for example, zinc, magnesium, aluminum, calcium, titanium, manganese, tin, and nickel, and antipyrine complexes of zinc thiocyanate, and complex zinc salts of terephthalaldehyde acid and other aromatic carboxylic acids, urea compounds such as N-p-toluenesulfonyl-N'-3-(p-toluenesulfonyloxy)phenylurea, N-p-toluenesulfonyl-N'-p-butoxycarbonylphenylurea, N-p-tolylsulfonyl-N'-phenylurea, and 4,4'-bis(p-toluenesulfonylaminocarbonylamino)diphenylmethane, thiourea compounds such as N,N'-di-m-chlorophenylthiourea, organic compounds having —$SO_2NH$— bond in the molecule such as N-(p-toluenesulfonyl)carbamoylic acid p-cumylphenyl ester, N-(p-toluenesulfonyl)carbamoylic acid p-benzyloxyphenyl ester, and N-(o-toluoyl)-p-toluenesulfamide, and inorganic acid substances such as activated clay, attapulgite, colloidal silica, and aluminum silicate.

In addition, sulfonamide compounds such as N-[2-(3-phenylureido)phenyl]benzenesulfonamide represented by the following General Formula (1), N-[2-(3-phenylureido) phenyl]-p-toluenesulfonamide, N-[2-(3-phenylureido)phenyl]-o-toluenesulfonamide, and N-[2-(3-(4-methylphenyl) ureido)phenyl]benzenesulfonamide may be exemplified. Among these, N-[2-(3-phenylureido)phenyl]benzenesulfonamide is preferable because it reduces heat-resistant background fogging, improves print preservation, and is easy to synthesize.

[Chem. 1]

(1)

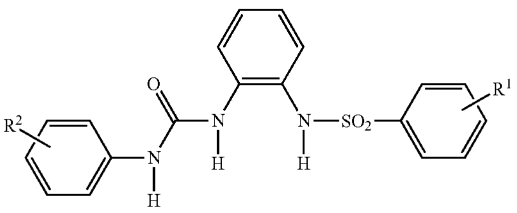

In Formula (1), $R^1$ and $R^2$ may be the same as or different from each other, and each represent a hydrogen atom, an alkyl group having 1 to 4 carbon atoms, an alkoxy group having 1 to 4 carbon atoms, or a halogen atom.

In addition, urea urethane derivatives such as 4,4'-bis[(4-methyl-3-phenoxycarbonylaminophenyl)ureido]diphenylsulfone represented by the following General Formula (2), 4,4'-bis[(2-methyl-5-phenoxycarbonylaminophenyl) ureido]diphenylsulfone, and 4-(2-methyl-3-phenoxycarbonylaminophenyl)ureido-4'-(4-methyl-5-phenoxycarbonylaminophenyl)ureidodiphenylsulfone may be exemplified. Among these, 4,4'-bis[(4-methyl-3-phenoxycarbonylaminophenyl)ureido]diphenylsulfone is preferable.

In addition, diphenyl sulfone derivatives represented by the following General Formula (3) may be exemplified.

[Chem. 2]

(2)

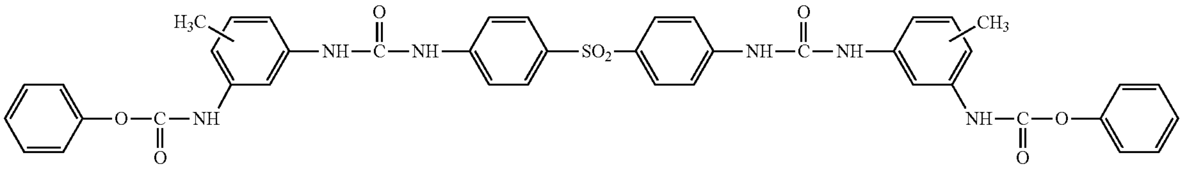

[Chem. 3]

(3)

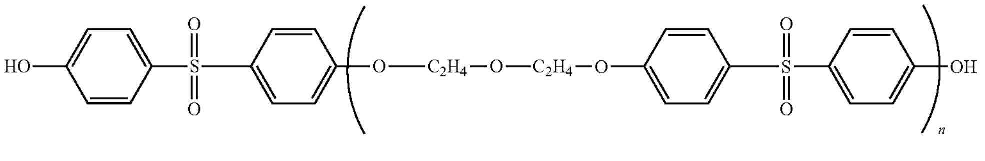

In Formula (3), n represents an integer of 1 to 6. Naturally, the coloring agent is not limited thereto, and as necessary, two or more compounds may be used in combination.

The content of such a coloring agent is not particularly limited, and may be adjusted according to the leuco dye used. The content of the coloring agent generally with respect to 1 part by mass of the leuco dye is preferably 0.5 parts by mass or more, more preferably 0.8 parts by mass or more, still more preferably 1 part by mass or more, yet more preferably 1.2 parts by mass or more, and particularly preferably 1.5 parts by mass or more. In addition, the content of the coloring agent with respect to 1 part by mass of the leuco dye is preferably 10 parts by mass or less, more preferably 5 parts by mass or less, still more preferably 4 parts by mass or less, and particularly preferably 3.5 parts by mass or less. When the content is 0.5 parts by mass or more, it is possible to improve recording performance. On the other hand, when the content is 10 parts by mass or less, it is possible to effectively reduce background fogging in a high-temperature environment (heat-resistant background fogging).

(Preservation Improving Agent)

In the present invention, the heat-sensitive recording layer may further contain a preservation improving agent in order to further improve mainly preservation of color-developed images. As such a preservation improving agent, for example, at least one or more selected from among phenol compounds such as 1,1,3-tris(2-methyl-4-hydroxy-5-cyclohexylphenyl)butane, 1,1,3-tris(2-methyl-4-hydroxy-5-tert-butylphenyl)butane, 1,1-bis(2-methyl-4-hydroxy-5-tert-butylphenyl)butane, 4,4'-[1,4-phenylenebis(1-methylethylidene)]bisphenol, and 4,4'-[1,3-phenylenebis(1-methylethylidene)]bisphenol; epoxy compounds such as 4-benzyloxyphenyl-4'-(2-methyl-2,3-epoxypropyloxy)phenylsulfone, 4-(2-methyl-1,2-epoxyethyl)diphenyl sulfone, and 4-(2-ethyl-1,2-epoxyethyl)diphenyl sulfone; and isocyanuric acid compounds such as 1,3,5-tris(2,6-dimethylbenzyl-3-hydroxy-4-tert-butyl)isocyanuric acid can be used. Naturally, the present invention is not limited thereto, and as necessary, two or more compounds may be used in combination.

When a preservation improving agent is used, the amount thereof used may be an amount effective for improving preservation, and usually, it is preferably about 1 to 30 mass % and more preferably about 5 to 20 mass % with respect to a total solid content of the heat-sensitive recording layer.

(Sensitizer)

The heat-sensitive recording layer in the present invention may contain a sensitizer. Thus, it is possible to increase the recording sensitivity. Examples of sensitizers include stearic acid amide, methoxycarbonyl-N-stearate benzamylde, N-benzoyl stearamide, N-eicosamide, ethylene bis stearamide, behenic acid amide, methylenebisstearic acid amide, N-methylol stearic acid amide, dibenzyl terephthalate, dimethyl terephthalate, dioctyl terephthalate, diphenyl sulfone, benzyl p-benzyloxybenzoate, phenyl 1-hydroxy-2-naphthoate, 2-naphthylbenzyl ether, m-terphenyl, p-benzylbiphenyl, di-p-chlorobenzyl oxalate ester, oxalic acid di-p-methylbenzyl ester, oxalic acid dibenzyl ester, p-tolylbiphenyl ether, di(p-methoxyphenoxyethyl)ether, 1,2-di(3-methylphenoxy)ethane, 1,2-di(4-methylphenoxy)ethane, 1,2-di(4-methoxyphenoxy)ethane, 1,2-di(4-chlorophenoxy)ethane, 1,2-diphenoxyethane, 1-(4-methoxyphenoxy)-2-(3-methylphenoxy))ethane, p-methylthiophenyl benzyl ether, 1,4-di(phenylthio)butane, p-acetotoluidide, p-acetophenetidide, N-acetoacetyl-p-toluidine, 1,2-diphenoxymethylbenzene, di(β-biphenylethoxy)benzene, p-di(vinyloxyethoxy)benzene, 1-isopropylphenyl-2-phenylethane, di-o-chlorobenzyl adipate, 1,2-bis(3,4-dimethylphenyl)ethane, 1,3-bis(2-naphthoxy)propane, diphenyl, and benzophenone. These can be used in combination as long as there is no problem. The content of the sensitizer may be an amount effective for sensitization, and usually it is preferably about 2 to 40 mass % and more preferably about 5 to 25 mass % with respect to a total solid content of the heat-sensitive recording layer.

(Binding Resin)

The heat-sensitive recording layer may contain a binding resin (binder). As the binder used in a heat-sensitive recording layer coating liquid, for example, water-based adhesives such as water-soluble adhesives and water-dispersible adhesives can be used. Examples of water-soluble adhesives include modified-polyvinyl alcohols such as polyvinyl alcohol, carboxy-modified polyvinyl alcohol, acetoacetyl-modified polyvinyl alcohol, diacetone-modified polyvinyl alcohol, and silicon-modified polyvinyl alcohol, starch and its derivatives, cellulose derivatives such as methoxy cellulose, carboxymethyl cellulose, hydroxyethyl cellulose, hydroxypropyl methylcellulose, methylcellulose, and ethyl cellulose, sodium polyacrylate, polyvinylpyrrolidone, polyamide, diisobutylene-maleic anhydride copolymer salts, styrene-acrylic acid copolymer salts, styrene-maleic anhydride copolymer salts, ethylene-maleic anhydride copolymer salts, acrylamide-acrylic acid ester copolymers, acrylamide-acrylic acid ester-methacrylic acid copolymers, polyacrylamide, sodium alginate, gelatin, casein, and gum arabic. Examples of water-dispersible adhesives include emulsions of polyvinyl acetate, polyurethane, polyacrylic acid, polyacrylic acid ester, vinyl chloride-vinyl acetate copolymers, polybutyl methacrylate, ethylene-vinyl acetate copolymers or the like, and latexes of water-insoluble polymers such as styrene-butadiene copolymers and styrene-butadiene-acrylic copolymers. Each of them may be used alone or two or more of them may be used in combination. The content of at least one of them with respect to a total solid content of the heat-sensitive recording layer is in a range of preferably about 5 to 50 mass %, and more preferably about 10 to 40 mass %.

(Cross-Linking Agent)

The heat-sensitive recording layer may contain a cross-linking agent for curing the binder for the heat-sensitive recording layer. When the cross-linking agent is contained, it is possible to improve water resistance of the heat-sensitive recording layer. Examples of cross-linking agents include aldehyde compounds such as glyoxal, polyamine compounds such as polyethylene imine, epoxy compounds, polyamide resins, melamine resins, glyoxylate, dimethylol urea compounds, aziridine compounds, and blocked isocyanate compounds; inorganic compounds such as ammonium persulfate, ferric chloride, magnesium chloride, sodium tetraborate, and potassium tetraborate; boric acid, boric acid triester, boron polymers, hydrazide compounds, and glyoxylate. Each of them may be used alone or two or more of them may be used in combination. The amount of the cross-linking agent used with respect to 100 parts by mass of a total solid content of the heat-sensitive recording layer is preferably in a range of about 1 to 10 parts by mass. Thus, it is possible to improve water resistance of the heat-sensitive recording layer.

(Others)

The heat-sensitive recording layer may contain known waxes, metal soaps, colored dyes, colored pigments, fluorescent dyes and the like as necessary as long as the effects of the invention are not impaired.

Examples of waxes include waxes such as paraffin wax, carnauba wax, microcrystalline wax, polyolefin wax, and polyethylene wax; and for example, higher fatty acid amides such as stearic acid amide and ethylene bis stearamide, higher fatty acid esters and its derivatives.

Examples of metal soaps include higher fatty acid polyvalent metal salts, for example, zinc stearate, aluminum stearate, calcium stearate, and zinc oleate. In addition, as necessary, as long as the effects of the present invention are not impaired, various auxiliary agents such as an oil repellent, an antifoaming agent, and a viscosity adjusting agent can be additionally added to the heat-sensitive recording layer. In addition, after these auxiliary agents are dissolved in a solvent to prepare a solution, the auxiliary agent solution that is emulsified in water with an emulsifier can be used. As the emulsifier, a water-soluble polymer can be used.

(Application of Heat-Sensitive Recording Layer Coating Liquid)

The heat-sensitive recording layer is formed by applying the heat-sensitive recording layer coating liquid onto the undercoat layer and then drying it. The coating amount of the heat-sensitive recording layer coating liquid in terms of dry mass is preferably about 2 to 12 g/m$^2$, more preferably about 2 to 8 g/m$^2$, and still more preferably about 2 to 7 g/m$^2$. The heat-sensitive recording layer coating liquid is prepared, for example, using a dispersion liquid obtained by using water as a dispersion medium, and by dispersing fine particles of a leuco dye and a coloring agent, a binding resin (binder), a preservation improving agent, a sensitizer and the like together or separately.

[Protective Layer]

A protective layer for protecting the heat-sensitive recording layer from heat and various external factors can be provided on the heat-sensitive recording layer. The protective layer is prepared, for example, by mixing a binder, and as necessary, a pigment, a wax, a cross-linking agent, other auxiliary agents and the like. As the binder, materials exemplified for the above heat-sensitive recording layer can be used. When a pigment and wax are contained, it is possible to prevent scum from adhering and sticking to the thermal head. In addition, when a cross-linking agent is added, it is possible to impart water resistance to the protective layer. The protective layer is formed by applying the protective layer coating liquid onto the heat-sensitive recording layer using water as a dispersion medium so that the coating amount thereof in terms of dry mass is preferably about 0.1 to 15 g/m$^2$, and more preferably about 0.5 to 8 g/m$^2$.

[Other Layers]

In addition to the layers described above, an additional layer may be provided in order to increase the added value of the heat-sensitive recording material, and thus the heat-sensitive recording material with higher functions may be provided. For example, when an adhesive layer containing an adhesive, a remoistening adhesive, a delayed tack type adhesive or the like is provided on the back surface, the heat-sensitive recording material can be formed as adhesive paper, remoistening adhesive paper, delayed tack paper or the like.

In addition, by utilizing the back surface, the function of thermal transfer paper, inkjet recording paper, carbonless paper, electrostatic recording paper, or Xerography paper is imparted and the heat-sensitive recording material can be formed as recording paper capable of double-sided recording. Naturally, it can be formed as a double-sided heat-sensitive recording material. In addition, a back layer can be provided to suppress penetration of an oil and a plasticizer from the back surface of the heat-sensitive recording material, and to control curl and prevent electrification. A linerless label that does not require release paper can be obtained by applying and processing a release layer containing silicone onto the protective layer, and applying and processing the adhesive to the back surface.

[Heat-Sensitive Recording Material]

(Method of Forming Layers)

As a method of forming the above layers on the support, any of known application methods such as an air knife method, a blade method, a gravure method, a roll coater method, a spray method, a dip method, a bar method, a curtain method, a slot die method, a slide die method, and an extrusion method may be used. In addition, each coating liquid may be applied to one layer and dried to form each layer or the same coating liquid may be applied to two or more layers. In addition, simultaneous multi-layer coating in which two or more layers are coated at the same time may be performed.

(Smoothing Treatment)

In order to increase the recording sensitivity and prevent white spots and the like, after each layer is completely formed or all layers are completely formed, it is preferable to perform a smoothing treatment using a known method such as a super calender or a soft calender.

EXAMPLES

The present invention will be described in more detail with reference to examples, but the present invention is not limited thereto. Here, unless otherwise specified, "parts" and "%" indicate "parts by mass" and "mass %," respectively.

Hollow particles used in examples and comparative examples were as follows.

Hollow particles A: a median diameter (D50) of 11 μm, a maximum particle diameter (D100) of 23 μm, a hollowness of 93%, 0 volume % of particles having particle diameters of 2 μm or less and a solid content concentration of 15.0%, hollow particles B: a median diameter (D50) of 8.1 μm, a maximum particle diameter (D100) of 20 μm, a hollowness of 90%, 0 volume % of particles having particle diameters of 2 μm or less, and a solid content concentration of 15.0%, hollow particles C: a median diameter (D50) of 7.5 μm, a maximum particle diameter (D100) of 15 μm, a hollowness of 85%, 0 volume % of particles having particle diameters of 2 μm or less, and a solid content concentration of 15.0%, hollow particles D: a median diameter (D50) of 6.2 μm, a maximum particle diameter (D100) of 15 μm, a hollowness of 77%, 0 volume % particles having particle diameters of 2 μm or less, and a solid content concentration of 15.0%, hollow particles E: a median diameter (D50) of 5.0 μm, a maximum particle diameter (D100) of 13.5 μm, a hollowness of 90%, 0.2 volume % of particles having particle diameters of 2 μm or less, and a solid content concentration of 15.0%, hollow particles F: hollow particles (product name A-380, commercially available from Sansuisha Co., Ltd.), a median diameter (D50) of 3.8 μM, a maximum particle diameter (D100) of 6.5 μm, a hollowness of 78%, 1.5 volume % of hollow particles having particle diameters of 2.0 μm or less, and a solid content concentration of 13.0%, hollow particles G: hollow particles (product name Matsumoto Microsphere F series, commercially available from Matsumoto Yushi-Seiyaku Co., Ltd.), a median diameter (D50) of 3.7 μm, a maximum particle diameter (D100) of 12.6 μM, a hollowness of 84%, 6.4 volume % of hollow particles having particle diameters of 2.0 μm or less, and a solid content concentration of 15.0%, hollow particles H: a median diameter (D50) of 12 μm, a maximum particle diameter (D100) of 124 μm, a hollowness of 94%, 0 volume % particles having particle diameters of 2 μm or less, and a solid content concentration of 15.0%, hollow particles I: hollow particles (product name Expancel 461WE20d36, commercially available from Nouryon), a median diameter (D50) of 20 μm, a maximum particle diameter (D100) of 80 μm, a hollowness of 95%, 0 volume % particles having particle diameters of 2 μm or less, and a solid content concentration of 15.0%, hollow particles J: a median diameter (D50) of 12 μm, a maximum particle diameter (D100) of 45 μm, a hollowness of 94%, 0 volume % particles having particle diameters of 2 μm or less, and a solid content concentration of 15.0%.

The median diameter (D50) and the maximum particle diameter (D100) of hollow particles were measured using a laser diffraction type particle diameter measuring instrument SALD2200 (commercially available from Shimadzu Corporation) at a refractive index of 1.70-0.01i.

Inorganic pigments used in examples and comparative examples are as follows.

Inorganic pigment A: fired kaolin (product name Ansilex 93, commercially available from BASF), and an oil absorption of 104 ml/100 g, inorganic pigment B: silica (product name Nipsil E743, commercially available from Tosoh Corporation), and an oil absorption of 155 ml/100 g, inorganic pigment C: calcium carbonate (product name Callite SA, commercially available from Shiraishi Calcium Kaisha, Ltd.), and an oil absorption of 75 ml/100 g, inorganic pigment D: kaolin (product name HG90, commercially available from KaMin LLC), and an oil absorption of 49 ml/100 g Latexes used in examples and comparative examples are as follows.

Latex A: developed styrene-butadiene latex product (Tg: −10° C., a particle diameter of 190 nm and a solid content concentration of 48%), latex B: developed styrene-butadiene latex product (Tg: −35° C., a particle diameter of 300 nm and a solid content concentration of 48%), latex C: styrene-butadiene latex (product name L-1571, commercially available from Asahi Kasei Corporation, Tg=−3° C., a particle diameter of 190 nm and a solid content concentration of 48%)

Example 1-1

(1) Preparation of Undercoat Layer Coating Liquid 133.3 parts of the hollow particles A, 50 parts of fired kaolin (product name Ansilex 93, commercially available from BASF), 25 parts of the latex A, 7.5 parts of a 20% solution of oxidized starch, 3.5 parts of carboxymethyl cellulose (product name: Cellogen AG GUM, commercially available from DKS Co., Ltd.), and 75.0 parts of water were mixed and stirred to obtain an undercoat layer coating liquid.

(2) Preparation of Leuco Dye Dispersion Liquid (Liquid A)

40 parts of 3-di-(n-butyl)amino-6-methyl-7-anilinofluorane, 40 parts of an aqueous solution containing 10% of polyvinyl alcohol (a degree of polymerization of 500 and a degree of saponification of 88%), and 20 parts of water were mixed, and using a sand mill (sand grinder, commercially available from IMEX Co., Ltd.), the mixture was pulverized until the median diameter measured by a laser diffraction type particle diameter measuring instrument SALD2200 (commercially available from Shimadzu Corporation) was 0.5 μm, to obtain a leuco dye dispersion liquid (liquid A).

(3) Preparation of Coloring Agent Dispersion Liquid (Liquid B)

40 parts of 4-hydroxy-4'-isopropoxydiphenylsulfone (D8, commercially available from Nippon Soda Co., Ltd.), 40 parts of an aqueous solution containing 10% of polyvinyl alcohol (a degree of polymerization of 500, and a degree of saponification of 88%) and 20 parts of water were mixed, and using a sand mill (sand grinder, commercially available from IMEX Co., Ltd.), the mixture was pulverized until the median diameter measured by a laser diffraction type particle diameter measuring instrument SALD2200 (commercially available from Shimadzu Corporation) was 1.0 μM, to obtain a coloring agent dispersion liquid (liquid B).

(4) Preparation of Sensitizer Dispersion Liquid (Liquid C)

40 parts of oxalic acid di-p-methylbenzyl ester (product name: HS-3520, commercially available from DIC), 40 parts of an aqueous solution containing 10% of polyvinyl alcohol (a degree of polymerization of 500, and a degree of saponification of 88%) and 20 parts of water were mixed, and using a sand mill (sand grinder, commercially available from IMEX Co., Ltd.), the mixture was pulverized until the median diameter measured by a laser diffraction type particle diameter measuring instrument SALD2200 (commercially available from Shimadzu Corporation) was 1.0 μm, to obtain a sensitizer dispersion liquid (liquid C).

(5) Preparation of Heat-Sensitive Recording Layer Coating Liquid 29.5 parts of the liquid A, 59.1 parts of the liquid B, 22.7 parts of the liquid C, 20 parts of an aqueous solution containing 5% of hydroxypropyl methyl cellulose, 146 parts of an aqueous solution containing 10% of completely saponified polyvinyl alcohol (product name: PVA110, a degree of saponification of 99 mol % and an average degree of polymerization of 1,000, commercially available from Kuraray Co., Ltd.), 9.4 parts of butadiene-based copolymer latex (product name: L-1571, commercially available from Asahi Kasei Corporation, a solid content concentration of 48%), 25.4 parts of light calcium carbonate (product name: Brilliant-15, commercially available from Shiraishi Kogyo Kaisha, Ltd.), 11.7 parts of paraffin wax (product name: Hydrin L-700, commercially available from Chukyo Yushi Co., Ltd., a solid content concentration of 30%), 2 parts of adipic acid dihydrazide (commercially available from Otsuka Chemical Co., Ltd.), and 120 parts of water were mixed and stirred to obtain a heat-sensitive recording layer coating liquid.

(6) Preparation of Protective Layer Coating Liquid

A composition composed of 300 parts of an aqueous solution containing 12% of acetoacetyl-modified polyvinyl alcohol (product name: Gohsenx Z-200, a degree of saponification of 99.4 mol %, an average degree of polymerization of 1,000, and a degree of denaturation of 5 mol %, commercially available from The Nippon Synthetic Chemical Industry Co., Ltd.), 19 parts of kaolin (product name:

HYDRAGLOSS90, commercially available from KaMin LLC), 35 parts of aluminum hydroxide (product name: Higilite H-42M, commercially available from Showa Denko K.K.), 4 parts of silica (product name: Mizukasil P-527, commercially available from Mizusawa Industrial Chemicals, Ltd.), 2.5 parts of polyethylene wax (product name: Chemipearl W-400, commercially available from Mitsui Chemicals, Inc., a solid content concentration of 40%), and 114.5 parts of water was mixed and stirred to obtain a protective layer coating liquid.

(7) Preparation of Heat-Sensitive Recording Material

On one surface of high-quality paper having a basis weight of 60 g/$m^2$, the undercoat layer coating liquid, the heat-sensitive recording layer coating liquid, and the protective layer recording coating liquid were applied and dried so that the coating amounts after drying were 4.0 g/$m^2$, 4.0 g/$m^2$, and 2.0 g/$m^2$, respectively, an undercoat layer, a heat-sensitive recording layer, and a protective layer were sequentially formed and the surface was then smoothened with a super calender to obtain a heat-sensitive recording material.

Example 1-2

A heat-sensitive recording material was obtained in the same manner as in Example 1-1 except that the hollow particles B were used in place of the hollow particles A in the preparation of the undercoat layer coating liquid of Example 1-1.

Example 1-3

A heat-sensitive recording material was obtained in the same manner as in Example 1-1 except that the amount of the hollow particles A was changed from 133.3 parts to 46.7 parts, and the amount of fired kaolin was changed from 50.0 parts to 63.0 parts in the preparation of the undercoat layer coating liquid of Example 1-1.

Example 1-4

A heat-sensitive recording material was obtained in the same manner as in Example 1-1 except that the amount of the hollow particles A was changed from 133.3 parts to 186.7 parts, and the amount of fired kaolin was changed from 50.0 parts to 42.0 parts in the preparation of the undercoat layer coating liquid of Example 1-1.

Example 1-5

A heat-sensitive recording material was obtained in the same manner as in Example 1-1 except that the amount of the hollow particles A was changed from 133.3 parts to 26.7 parts, and the amount of fired kaolin was changed from 50.0 parts to 66.0 parts in the preparation of the undercoat layer coating liquid of Example 1-1.

Example 1-6

A heat-sensitive recording material was obtained in the same manner as in Example 1-1 except that the amount of the hollow particles A was changed from 133.3 parts to 206.7 parts, and the amount of fired kaolin was changed from 50.0 parts to 39.0 parts in the preparation of the undercoat layer coating liquid of Example 1-1.

Example 1-7

A heat-sensitive recording material was obtained in the same manner as in Example 1-1 except that the amount of the hollow particles A was changed from 133.3 parts to 240.0 parts, and the amount of the fired kaolin was changed from 50.0 parts to 34.0 parts in the preparation of the undercoat layer coating liquid of Example 1-1.

Example 1-8

A heat-sensitive recording material was obtained in the same manner as in Example 1-1 except that the coating amount of the undercoat layer after drying was changed from 4.0 g/$m^2$ to 8.0 g/$m^2$ in the preparation of the heat-sensitive recording material of Example 1-1.

Example 1-9

A heat-sensitive recording material was obtained in the same manner as in Example 1-1 except that the coating amount of the undercoat layer after drying was changed from 4.0 g/$m^2$ to 12.0 g/$m^2$ in the preparation of the heat-sensitive recording material of Example 1-1.

Example 1-10

A heat-sensitive recording material was obtained in the same manner as in Example 1-1 except that the coating amount of the undercoat layer after drying was changed from 4.0 g/$m^2$ to 2.0 g/$m^2$ in the preparation of the heat-sensitive recording material of Example 1-1.

Example 1-11

A heat-sensitive recording material was obtained in the same manner as in Example 1-1 except that the latex B was used in place of the latex A in the preparation of the undercoat layer coating liquid of Example 1-1.

Example 1-12

A heat-sensitive recording material was obtained in the same manner as in Example 1-1 except that the latex C was used in place of the latex A in the preparation of the undercoat layer coating liquid of Example 1-1.

Example 1-13

A heat-sensitive recording material was obtained in the same manner as in Example 1-1 except that 4-hydroxy-4'-n-propoxydiphenylsulfone (Tomirac KN, commercially available from Mitsubishi Chemical Corporation) was used in place of 4-hydroxy-4'-isopropoxydiphenylsulfone (D8, commercially available from Nippon Soda Co., Ltd.) in the preparation of the coloring agent dispersion liquid of Example 1-1.

Example 1-14

A heat-sensitive recording material was obtained in the same manner as in Example 1-1 except that N-[2-(3-phenylureido)phenyl]benzenesulfonamide (NKK-1304, commercially available from Nippon Soda Co., Ltd.) was used in place of 4-hydroxy-4'-isopropoxydiphenylsulfone (D8, commercially available from Nippon Soda Co., Ltd.) in the preparation of the coloring agent dispersion liquid of Example 1-1.

Example 1-15

A heat-sensitive recording material was obtained in the same manner as in Example 1-1 except that the hollow particles C were used in place of the hollow particles A in the preparation of the undercoat layer coating liquid of Example 1-1.

Example 1-16

A heat-sensitive recording material was obtained in the same manner as in Example 1-1 except that the hollow particles D were used in place of the hollow particles A in the preparation of the undercoat layer coating liquid of Example 1-1.

Example 1-17

A heat-sensitive recording material was obtained in the same manner as in Example 1-1 except that the hollow particles E were used in place of the hollow particles A in the preparation of the undercoat layer coating liquid of Example 1-1.

Example 1-18

A heat-sensitive recording material was obtained in the same manner as in Example 1-17 except that N-[2-(3-phenylureido)phenyl]benzenesulfonamide (NKK-1304, commercially available from Nippon Soda Co., Ltd.) was used in place of 4-hydroxy-4'-isopropoxydiphenylsulfone (D8, commercially available from Nippon Soda Co., Ltd.) in the preparation of the coloring agent dispersion liquid of Example 1-1.

Comparative Example 1-1

A heat-sensitive recording material was obtained in the same manner as in Example 1-1 except that 153.8 parts of the hollow particles F was used in place of 133.3 parts of the hollow particles A in the preparation of the undercoat layer coating liquid of Example 1-1.

Comparative Example 1-2

A heat-sensitive recording material was obtained in the same manner as in Example 1-1 except that the hollow particles G were used in place of the hollow particles A in the preparation of the undercoat layer coating liquid of Example 1-1.

Comparative Example 1-3

A heat-sensitive recording material was obtained in the same manner as in Example 1-1 except that the hollow particles H were used in place of the hollow particles A in the preparation of the undercoat layer coating liquid of Example 1-1.

Comparative Example 1-4

A heat-sensitive recording material was obtained in the same manner as in Example 1-1 except that the hollow particles I were used in place of the hollow particles A in the preparation of the undercoat layer coating liquid of Example 1-1.

Comparative Example 1-5

A heat-sensitive recording material was obtained in the same manner as in Example 1-1 except that the hollow particle J were used in place of the hollow particles A in the preparation of the undercoat layer coating liquid of Example 1-1.

The heat-sensitive recording materials prepared in the above Example 1-1 to 1-18, and Comparative Example 1-1 to 1-5 were subjected to the following evaluation, and the results are shown in Table 1.

[Recording Density]

Using a heat-sensitive recording evaluation machine (product name: TH-PMD, commercially available from Ohkura Electric Co., Ltd.), recording was performed on each heat-sensitive recording material at an applied energy of 0.17 mJ/dot, and the obtained printed part was measured in a visual mode of a Macbeth Densitometer (RD-914, commercially available from Macbeth). A larger numerical value indicates a higher print density. Since the recording density was required to be 1.00 or more for practical use, a value of 1.00 or more was evaluated to be satisfactory.

[Printed Image Quality]

A barcode was recorded using a label printer (product name: L-2000, commercially available from Ishida Co., Ltd.), the recorded image quality was visually observed and evaluated based on the following criteria.

⊚, O, and Δ were satisfactory, and x was unsatisfactory.

⊚: Especially excellent, with no white spots in the image quality at all and with no missing parts of the barcode and no broadening of the barcode at all.

O: No problem, with no white spots in the image quality and no missing parts of the barcode and no broadening of the barcode.

Δ: No problem in practical use, with almost no white spots in the image quality and almost no missing parts of the barcode and almost no broadening of the barcode.

x: Problem in practical use, with white spots in the image and with missing parts of the barcode and broadening of the barcode.

[Heat-Resistant Background Fogging]

Each heat-sensitive recording material was left under conditions of 80° C. for 24 hours, and the reflection density of the white paper part was measured with the Macbeth Densitometer. If the measured value was 0.20 or less, there was no problem in use, and if it was 0.10 or less, it was more preferable.

TABLE 1

| | Undercoat layer | | | | | | | |
|---|---|---|---|---|---|---|---|---|
| | Type of hollow particles | D100 (μm) | D50 (μm) | D100/D50 | Hollowness (%) | Percentage (volume %) of particles having particle diameters of 2 μm or less | Content of hollow particles (mass %) | Content of fired kaolin (mass %) |
| Example 1-1 | A | 23 | 11 | 2.1 | 93 | 0 | 20 | 50 |
| Example 1-2 | B | 20 | 8.1 | 2.5 | 90 | 0 | 20 | 50 |
| Example 1-3 | A | 23 | 11 | 2.1 | 93 | 0 | 7 | 63 |
| Example 1-4 | A | 23 | 11 | 2.1 | 93 | 0 | 28 | 42 |

TABLE 1-continued

| | | | | | | | | |
|---|---|---|---|---|---|---|---|---|
| Example 1-5 | A | 23 | 11 | 2.1 | 93 | 0 | 4 | 66 |
| Example 1-6 | A | 23 | 11 | 2.1 | 93 | 0 | 31 | 39 |
| Example 1-7 | A | 23 | 11 | 2.1 | 93 | 0 | 36 | 34 |
| Example 1-8 | A | 23 | 11 | 2.1 | 93 | 0 | 20 | 50 |
| Example 1-9 | A | 23 | 11 | 2.1 | 93 | 0 | 20 | 50 |
| Example 1-10 | A | 23 | 11 | 2.1 | 93 | 0 | 20 | 50 |
| Example 1-11 | A | 23 | 11 | 2.1 | 93 | 0 | 20 | 50 |
| Example 1-12 | A | 23 | 11 | 2.1 | 93 | 0 | 20 | 50 |
| Example 1-13 | A | 23 | 11 | 2.1 | 93 | 0 | 20 | 50 |
| Example 1-14 | A | 23 | 11 | 2.1 | 93 | 0 | 20 | 50 |
| Example 1-15 | C | 15 | 7.5 | 2.0 | 85 | 0 | 20 | 50 |
| Example 1-16 | D | 15 | 6.2 | 2.4 | 77 | 0 | 20 | 50 |
| Example 1-17 | E | 13.5 | 5 | 2.7 | 90 | 0.2 | 20 | 50 |
| Example 1-18 | E | 13.5 | 5 | 2.7 | 90 | 0.2 | 20 | 50 |
| Comparative Example 1-1 | F | 6.5 | 3.8 | 1.7 | 78 | 1.6 | 20 | 50 |
| Comparative Example 1-2 | G | 13 | 3.7 | 3.5 | 84 | 6.4 | 20 | 50 |
| Comparative Example 1-3 | H | 124 | 12 | 10.3 | 94 | 0 | 20 | 50 |
| Comparative Example 1-4 | I | 80 | 20 | 4.0 | 95 | 0 | 20 | 50 |
| Comparative Example 1-5 | J | 45 | 12 | 3.8 | 94 | 0 | 20 | 50 |

| | Undercoat layer | | | Heat-sensitive recording layer | Evaluation | | |
|---|---|---|---|---|---|---|---|
| | Type of latex | Tg of latex (° C.) | Coating amount of undercoat layer (g/m$^2$) | Type of coloring agent | Recording density | Print image quality | Heat-resistant background fogging |
| Example 1-1 | A | −10 | 4 | D-8 | 1.24 | ◎ | 0.18 |
| Example 1-2 | A | −10 | 4 | D-8 | 1.20 | ○ | 0.18 |
| Example 1-3 | A | −10 | 4 | D-8 | 1.20 | ○ | 0.18 |
| Example 1-4 | A | −10 | 4 | D-8 | 1.21 | ◎ | 0.18 |
| Example 1-5 | A | −10 | 4 | D-8 | 1.05 | Δ | 0.18 |
| Example 1-6 | A | −10 | 4 | D-8 | 1.15 | ◎ | 0.18 |
| Example 1-7 | A | −10 | 4 | D-8 | 1.05 | ◎ | 0.18 |
| Example 1-8 | A | −10 | 8 | D-8 | 1.20 | ◎ | 0.18 |
| Example 1-9 | A | −10 | 12 | D-8 | 1.06 | ◎ | 0.18 |
| Example 1-10 | A | −10 | 2 | D-8 | 1.05 | Δ | 0.18 |
| Example 1-11 | B | −35 | 4 | D-8 | 1.27 | ◎ | 0.18 |
| Example 1-12 | C | −3 | 4 | D-8 | 1.20 | Δ | 0.18 |
| Example 1-13 | A | −10 | 4 | Tomirac KN | 1.28 | ◎ | 0.09 |
| Example 1-14 | A | −10 | 4 | NKK-1304 | 1.22 | ◎ | 0.08 |
| Example 1-15 | A | −10 | 4 | D-8 | 1.10 | Δ | 0.18 |
| Example 1-16 | A | −10 | 4 | D-8 | 1.02 | Δ | 0.18 |
| Example 1-17 | A | −10 | 4 | D-8 | 1.22 | ○ | 0.18 |
| Example 1-18 | A | −10 | 4 | NKK-1304 | 1.20 | ○ | 0.08 |
| Comparative Example 1-1 | A | −10 | 4 | D-8 | 0.90 | X | 0.18 |
| Comparative Example 1-2 | A | −10 | 4 | D-8 | 1.02 | X | 0.18 |
| Comparative Example 1-3 | A | −10 | 4 | D-8 | 0.88 | ◎ | 0.18 |
| Comparative Example 1-4 | A | −10 | 4 | D-8 | 0.94 | ◎ | 0.18 |
| Comparative Example 1-5 | A | −10 | 4 | D-8 | 0.98 | ◎ | 0.18 |

Example 2-1

(1) Preparation of Undercoat Layer Coating Liquid 106.7 parts of the hollow particles A, 50 parts of the inorganic pigment A, 36.5 parts of the solid plastic particles (Glossdell 130S, a solid content concentration of 52%, commercially available from Mitsui Chemicals, Inc.), 10 parts of the latex A, 7.5 parts of a solution containing 20% of oxidized starch, 3.5 parts of carboxymethyl cellulose (product name: Cellogen AG GUM, commercially available from DKS Co., Ltd.), and 75.0 parts of water were mixed and stirred to obtain an undercoat layer coating liquid.

(2) Preparation of Leuco Dye Dispersion Liquid (Liquid A')

40 parts of 3-di(n-butyl)amino-6-methyl-7-anilinofluorane, 40 parts of an aqueous solution containing 10% of polyvinyl alcohol (a degree of polymerization of 500, and a degree of saponification of 88%), and 20 parts of water were mixed, and using a sand mill (sand grinder, commercially available from IMEX Co., Ltd.), the mixture was pulverized until the median diameter measured by a laser diffraction type particle diameter measuring instrument SALD2200 (commercially available from Shimadzu Corporation) was 0.5 μm, to obtain a leuco dye dispersion liquid (liquid A').

(3) Preparation of Coloring Agent Dispersion Liquid (Liquid B')

40 parts of 4-hydroxy-4'-isopropoxydiphenylsulfone (D8, commercially available from Nippon Soda Co., Ltd.), 40 parts of an aqueous solution containing 10% of polyvinyl alcohol (a degree of polymerization of 500, and a degree of saponification of 88%), and 20 parts of water were mixed, and using a sand mill (sand grinder, commercially available from IMEX Co., Ltd.), the mixture was pulverized until the median diameter measured by a laser diffraction type particle diameter measuring instrument SALD2200 (commercially available from Shimadzu Corporation) was 1.0 μM, to obtain a coloring agent dispersion liquid (liquid B').

(4) Preparation of Sensitizer Dispersion Liquid (Liquid C')

40 parts of oxalic acid di-p-methylbenzyl ester (product name: HS-3520, commercially available from DIC), 40 parts of an aqueous solution containing 10% of polyvinyl alcohol (a degree of polymerization of 500, and a degree of saponification of 88%), and 20 parts of water were mixed, and using a sand mill (sand grinder, commercially available from IMEX Co., Ltd.), the mixture was pulverized until the median diameter measured by a laser diffraction type particle diameter measuring instrument SALD2200 (commercially available from Shimadzu Corporation) was 1.0 μm, to obtain a sensitizer dispersion liquid (liquid C').

(5) Preparation of Heat-Sensitive Recording Layer Coating Liquid 29.5 parts of the liquid A', 59.1 parts of the liquid B', 45.4 parts of the liquid C', 20 parts of an aqueous solution containing 5% of hydroxypropyl methyl cellulose, 46 parts of an aqueous solution containing 10% of completely saponified polyvinyl alcohol (product name: PVA110, a degree of saponification of 99 mol % and an average degree of polymerization of 1,000, commercially available from Kuraray Co., Ltd.), 9.4 parts of a butadiene-based copolymer latex (product name: L-1571, commercially available from Asahi Kasei Corporation, a solid content concentration of 48%), 25.4 parts of light calcium carbonate (product name: Brilliant-15, commercially available from Shiraishi Kogyo Kaisha, Ltd.), 11.7 parts of paraffin wax (product name: Hydrin L-700, commercially available from Chukyo Yushi Co., Ltd., a solid content concentration of 30%), 2 parts of adipic acid dihydrazide (commercially available from Otsuka Chemical Co., Ltd.) and 120 parts of water were mixed and stirred to obtain a heat-sensitive recording layer coating liquid.

(6) Preparation of Protective Layer Coating Liquid

A composition composed of 300 parts of an aqueous solution containing 12% of acetoacetyl-modified polyvinyl alcohol (product name: Gohsenx Z-200, a degree of saponification of 99.4 mol %, an average degree of polymerization of 1,000, and a degree of denaturation of 5 mol %, commercially available from The Nippon Synthetic Chemical Industry Co., Ltd.), 19 parts of kaolin (product name: HYDRAGLOSS90, commercially available from KaMin LLC), 35 parts of aluminum hydroxide (product name: Higilite H-42M, commercially available from Showa Denko K.K.), 4 parts of silica (product name: Mizukasil P-527, commercially available from Mizusawa Industrial Chemicals, Ltd.), 2.5 parts of polyethylene wax (product name: Chemipearl W-400, commercially available from Mitsui Chemicals, Inc., a solid content concentration of 40%), and 114.5 parts of water was mixed and stirred to obtain a protective layer coating liquid.

(7) Preparation of Heat-Sensitive Recording Material

On one surface of high-quality paper having a basis weight of 60 g/$m^2$, the undercoat layer coating liquid, the heat-sensitive recording layer coating liquid, and the protective layer recording coating liquid were applied and dried so that the coating amounts after drying were 4.0 g/$m^2$, 4.0 g/$m^2$, and 2.0 g/$m^2$, respectively, an undercoat layer, a heat-sensitive recording layer, and a protective layer were sequentially formed and the surface was then smoothened with a super calender to obtain a heat-sensitive recording material.

Example 2-2

A heat-sensitive recording material was obtained in the same manner as in Example 2-1 except that 106.7 parts of the hollow particles B was used in place of 106.7 parts of the hollow particles A in the preparation of the undercoat layer coating liquid of Example 2-1.

Example 2-3

A heat-sensitive recording material was obtained in the same manner as in Example 2-1 except that 106.7 parts of the hollow particles A was changed to 40.0 parts, and 36.5 parts of the solid plastic particles (Glossdell 130S, a solid content concentration of 52%, commercially available from Mitsui Chemicals, Inc.) was changed to 55.8 parts in the preparation of the undercoat layer coating liquid of Example 2-1.

Example 2-4

A heat-sensitive recording material was obtained in the same manner as in Example 2-1 except that 106.7 parts of the hollow particles A was changed to 186.7 parts and 36.5 parts of the solid plastic particles (Glossdell 130S, a solid content concentration of 52%, commercially available from Mitsui Chemicals, Inc.) was changed to 13.5 parts in the preparation of the undercoat layer coating liquid of Example 2-1.

Example 2-5

A heat-sensitive recording material was obtained in the same manner as in Example 2-1 except that 106.7 parts of the hollow particles A was changed to 26.7 parts, and 36.5 parts of the solid plastic particles (Glossdell 130S, a solid content concentration of 52%, commercially available from Mitsui Chemicals, Inc.) was changed to 59.6 parts in the preparation of the undercoat layer coating liquid of Example 2-1.

Example 2-6

A heat-sensitive recording material was obtained in the same manner as in Example 2-1 except that 106.7 parts of the hollow particles A was changed to 213.3 parts, and 36.5 parts of the solid plastic particles (Glossdell 130S, a solid content concentration of 52%, commercially available from Mitsui Chemicals, Inc.) was changed to 5.8 parts in the preparation of the undercoat layer coating liquid of Example 2-1.

Example 2-7

A heat-sensitive recording material was obtained in the same manner as in Example 2-1 except that the coating amount of the undercoat layer after drying was changed from 4.0 $g/m^2$ to 12.0 $g/m^2$ in the preparation of the heat-sensitive recording material of Example 2-1.

Example 2-8

A heat-sensitive recording material was obtained in the same manner as in Example 2-1 except that the coating amount of the undercoat layer after drying was changed from 4.0 $g/m^2$ to 8.0 $g/m^2$ in the preparation of the heat-sensitive recording material of Example 2-1.

Example 2-9

A heat-sensitive recording material was obtained in the same manner as in Example 2-1 except that the coating amount of the undercoat layer after drying was changed from 4.0 $g/m^2$ to 2.0 $g/m^2$ in the preparation of the heat-sensitive recording material of Example 2-1.

Example 2-10

A heat-sensitive recording material was obtained in the same manner as in Example 2-1 except that 50 parts of the inorganic pigment A was changed to 30 parts and 36.5 parts of the solid plastic particles (Glossdell 130S, a solid content concentration of 52%, commercially available from Mitsui Chemicals, Inc.) was changed to 75.0 parts in the preparation of the undercoat layer coating liquid of Example 2-1.

Example 2-11

A heat-sensitive recording material was obtained in the same manner as in Example 2-1 except that 50 parts of the inorganic pigment A was changed to 65 parts and 36.5 parts of the solid plastic particles (Glossdell 130S, a solid content concentration of 52%, commercially available from Mitsui Chemicals, Inc.) was changed to 7.7 parts in the preparation of the undercoat layer coating liquid of Example 2-1.

Example 2-12

A heat-sensitive recording material was obtained in the same manner as in Example 2-1 except that 50 parts of the inorganic pigment A was changed to 10 parts, and 36.5 parts of the solid plastic particles (Glossdell 130S, a solid content concentration of 52%, commercially available from Mitsui Chemicals, Inc.) was changed to 113.5 parts in the preparation of the undercoat layer coating liquid of Example 2-1.

Example 2-13

A heat-sensitive recording material was obtained in the same manner as in Example 2-1 except that 50 parts of the inorganic pigment B was used in place of 50 parts of the inorganic pigment A in the preparation of the undercoat layer coating liquid of Example 2-1.

Example 2-14

A heat-sensitive recording material was obtained in the same manner as in Example 2-1 except that 50 parts of the inorganic pigment C was used in place of 50 parts of the inorganic pigment A in the preparation of the undercoat layer coating liquid of Example 2-1.

Example 2-15

A heat-sensitive recording material was obtained in the same manner as in Example 2-1 except that 50 parts of the inorganic pigment D was used in place of 50 parts of the inorganic pigment A in the preparation of the undercoat layer coating liquid of Example 2-1.

Example 2-16

A heat-sensitive recording material was obtained in the same manner as in Example 2-1 except that 10 parts of the latex B was used in place of 10 parts of the latex A in the preparation of the undercoat layer coating liquid of Example 2-1.

Example 2-17

A heat-sensitive recording material was obtained in the same manner as in Example 2-1 except that 10 parts of the latex C was used in place of 10 parts of the latex A in the preparation of the undercoat layer coating liquid of Example 2-1.

Example 2-18

A heat-sensitive recording material was obtained in the same manner as in Example 2-1 except that 4-hydroxyphenyl(4'-n-propoxyphenyl)sulfone (Tomirac KN, commercially available from Mitsubishi Chemical Corporation) was used in place of 4-hydroxy-4'-isopropoxydiphenylsulfone (D8, commercially available from Nippon Soda Co., Ltd.) in the preparation of the coloring agent dispersion liquid of Example 2-1.

Example 2-19

A heat-sensitive recording material was obtained in the same manner as in Example 2-1 except that 2-phenylsulfonylamino-N,N'-diphenylurea (NKK-1304, commercially available from Nippon Soda Co., Ltd.) was used in place of 4-hydroxy-4'-isopropoxydiphenylsulfone (D8, commercially available from Nippon Soda Co., Ltd.) in the preparation of the coloring agent dispersion liquid of Example 2-1.

Example 2-20

A heat-sensitive recording material was obtained in the same manner as in Example 2-1 except that 106.7 parts of the hollow particles C was used in place of 106.7 parts of the hollow particles A in the preparation of the undercoat layer coating liquid of Example 2-1.

Comparative Example 2-1

A heat-sensitive recording material was obtained in the same manner as in Example 2-1 except that 106.7 parts of the hollow particles H was used in place of 106.7 parts of the hollow particles A in the preparation of the undercoat layer coating liquid of Example 2-1.

Comparative Example 2-2

A heat-sensitive recording material was obtained in the same manner as in Example 2-1 except that 106.7 parts of the hollow particles I was used in place of 106.7 parts of the hollow particles A in the preparation of the undercoat layer coating liquid of Example 2-1.

Comparative Example 2-3

A heat-sensitive recording material was obtained in the same manner as in Example 2-1 except that 106.7 parts of the hollow particle J was used in place of 106.7 parts of the hollow particles A in the preparation of the undercoat layer coating liquid of Example 2-1.

Comparative Example 2-4

A heat-sensitive recording material was obtained in the same manner as in Example 2-1 except that 123.1 parts of the hollow particles F was used in place of 106.7 parts of the hollow particles A in the preparation of the undercoat layer coating liquid of Example 2-1.

Comparative Example 2-5

A heat-sensitive recording material was obtained in the same manner as in Example 2-1 except that 106.7 parts of the hollow particles G was used in place of 106.7 parts of the hollow particles A in the preparation of the undercoat layer coating liquid of Example 2-1.

The heat-sensitive recording materials prepared in the above Examples 2-1 to 2-20 and Comparative Examples 2-1 to 2-5 were subjected to the following evaluation, and the results are shown in Table 2.

[Halftone Recording Density]

Using a heat-sensitive recording evaluation machine (product name: TH-PMD, commercially available from Ohkura Electric Co., Ltd.), recording was performed on each heat-sensitive recording material in a halftone energy region at a printing speed of 4 inches/sec and an applied energy of 0.16 mJ/dot, the obtained printed part was measured in a visual mode of Macbeth Densitometer (RD-914, commercially available from Macbeth). A larger numerical value indicates a higher print density, and the recording density was required to be 1.00 or more for practical use, and 1.20 or more was more desirable.

[Image Quality]

Using a label printer (product name: L-2000, commercially available from Ishida Co., Ltd.), a barcode was recorded at a printing speed of 75 mm/sec and a printing density of 6, the recorded image quality was visually observed, and evaluated based on the following criteria.

◎: Especially excellent, with no white spots in the image quality at all and with no broadening of the barcode at all.

O: No problem, with no white spots in the image quality and no broadening of the barcode.

Δ: No problem in practical use, with almost no white spots in the image quality and with almost no broadening of the barcode.

x: Problem in practical use, with white spots in the image and with broadening of the barcode.

[Coating Surface Strength]

For each heat-sensitive recording material, using a printability tester (commercially available from Kokubo Seimitsu Co., Ltd.), the strength of the coating surface was evaluated in a dry pick generation test using 0.5 g of paper test ink SD50 red BT-13 (commercially available from T&K TOKA CO., LTD.).

◎: No peeling of the coating layer was observed.

O: Slight peeling of the coating layer was observed.

Δ: Slight peeling of the coating layer was observed, but there was no problem in actual use.

x: Peeling of the coating layer was frequently observed, which would be a problem in actual use.

TABLE 2

| | Hollow particles | | | | | | Inorganic pigment |
|---|---|---|---|---|---|---|---|
| | Hollow particles | D100 | D50 | D100/D50 | Hollowness (%) | Mass % | Inorganic pigment |
| Example 2-1 | A | 23 | 11 | 2.1 | 93 | 16 | A |
| Example 2-2 | B | 20 | 8.1 | 2.5 | 90 | 16 | A |
| Example 2-3 | A | 23 | 11 | 2.1 | 93 | 6 | A |
| Example 2-4 | A | 23 | 11 | 2.1 | 93 | 28 | A |
| Example 2-5 | A | 23 | 11 | 2.1 | 93 | 4 | A |
| Example 2-6 | A | 23 | 11 | 2.1 | 93 | 32 | A |
| Example 2-7 | A | 23 | 11 | 2.1 | 93 | 16 | A |
| Example 2-8 | A | 23 | 11 | 2.1 | 93 | 16 | A |
| Example 2-9 | A | 23 | 11 | 2.1 | 93 | 16 | A |
| Example 2-10 | A | 23 | 11 | 2.1 | 93 | 16 | A |
| Example 2-11 | A | 23 | 11 | 2.1 | 93 | 16 | A |
| Example 2-12 | A | 23 | 11 | 2.1 | 93 | 16 | A |
| Example 2-13 | A | 23 | 11 | 2.1 | 93 | 16 | B |
| Example 2-14 | A | 23 | 11 | 2.1 | 93 | 16 | C |
| Example 2-15 | A | 23 | 11 | 2.1 | 93 | 16 | D |
| Example 2-16 | A | 23 | 11 | 2.1 | 93 | 16 | A |
| Example 2-17 | A | 23 | 11 | 2.1 | 93 | 16 | A |
| Example 2-18 | A | 23 | 11 | 2.1 | 93 | 16 | A |
| Example 2-19 | A | 23 | 11 | 2.1 | 93 | 16 | A |
| Example 2-20 | C | 15 | 7.5 | 2.0 | 85 | 16 | A |
| Comparative Example 2-1 | H | 124 | 12 | 10.3 | 94 | 16 | A |
| Comparative Example 2-2 | I | 80 | 20 | 4.0 | 95 | 16 | A |
| Comparative Example 2-3 | J | 45 | 12 | 3.8 | 94 | 16 | A |
| Comparative Example 2-4 | F | 6.5 | 3.8 | 1.7 | 78 | 16 | A |
| Comparative Example 2-5 | G | 13 | 3.7 | 3.5 | 84 | 16 | A |

TABLE 2-continued

| | Inorganic pigment Oil absorption (ml/100 g) | Inorganic pigment Mass % | Tg of latex (° C.) | Coating amount of undercoat layer ($g/m^2$) | Heat-sensitive recording layer Type of coloring agent | Halftone printing density | Print image quality |
|---|---|---|---|---|---|---|---|
| Example 2-1 | 104 | 50 | −10 | 4 | D-8 | 1.24 | ◎ |
| Example 2-2 | 104 | 50 | −10 | 4 | D-8 | 1.20 | ○ |
| Example 2-3 | 104 | 50 | −10 | 4 | D-8 | 1.20 | ○ |
| Example 2-4 | 104 | 50 | −10 | 4 | D-8 | 1.21 | ◎ |
| Example 2-5 | 104 | 50 | −10 | 4 | D-8 | 1.05 | Δ |
| Example 2-6 | 104 | 50 | −10 | 4 | D-8 | 1.15 | ◎ |
| Example 2-7 | 104 | 50 | −10 | 12 | D-8 | 1.06 | ◎ |
| Example 2-8 | 104 | 50 | −10 | 8 | D-8 | 1.20 | ◎ |
| Example 2-9 | 104 | 50 | −10 | 2 | D-8 | 1.05 | Δ |
| Example 2-10 | 104 | 30 | −10 | 4 | D-8 | 1.20 | ○ |
| Example 2-11 | 104 | 65 | −10 | 4 | D-8 | 1.27 | ◎ |
| Example 2-12 | 104 | 10 | −10 | 4 | D-8 | 1.17 | Δ |
| Example 2-13 | 155 | 50 | −10 | 4 | D-8 | 1.27 | ◎ |
| Example 2-14 | 75 | 50 | −10 | 4 | D-8 | 1.09 | Δ |
| Example 2-15 | 49 | 50 | −10 | 4 | D-8 | 1.06 | Δ |
| Example 2-16 | 104 | 50 | −35 | 4 | D-8 | 1.28 | ◎ |
| Example 2-17 | 104 | 50 | −3 | 4 | D-8 | 1.20 | Δ |
| Example 2-18 | 104 | 50 | −10 | 4 | Tomirac KN | 1.29 | ◎ |
| Example 2-19 | 104 | 50 | −10 | 4 | NKK-1304 | 1.22 | ◎ |
| Example 2-20 | 104 | 50 | −10 | 4 | D-8 | 1.10 | Δ |
| Comparative Example 2-1 | 104 | 50 | −10 | 4 | D-8 | 0.88 | ◎ |
| Comparative Example 2-2 | 104 | 50 | −10 | 4 | D-8 | 0.94 | ◎ |
| Comparative Example 2-3 | 104 | 50 | −10 | 4 | D-8 | 0.98 | ◎ |
| Comparative Example 2-4 | 104 | 50 | −10 | 4 | D-8 | 0.90 | X |
| Comparative Example 2-5 | 104 | 50 | −10 | 4 | D-8 | 1.02 | X |

The invention claimed is:

1. A heat-sensitive recording material comprising:

an undercoat layer formed on one surface of a support; and a heat-sensitive recording layer formed on the undercoat layer, wherein the heat-sensitive recording layer contains a leuco dye and a coloring agent, the undercoat layer contains hollow particles and a binding resin, a maximum particle diameter of the hollow particles is 10 to 30 μm, a particle diameter of the hollow particles at cumulative 50 volume % is 4.0 to 15 μm, a ratio D100/D50 is 1.8 to 3.0, D100 representing the maximum particle diameter of the hollow particles, and D50 representing the particle diameter of the hollow particles at cumulative 50 volume %, a volume percentage of the hollow particles having particle diameters of 2.0 μm or less is 1% or less, and a content of the hollow particles with respect to a total solids content of the undercoat layer is 5 to 40 mass %.

2. The heat-sensitive recording material according to claim 1, wherein a hollowness of the hollow particles is 80 to 98%.

3. The heat-sensitive recording material according to claim 1, wherein a coating amount of the undercoat layer after drying is 2.0 to 10 $g/m^2$.

4. The heat-sensitive recording material according to claim 1, wherein the coloring agent contains 4-hydroxy-4'-n-propoxydiphenylsulfone or N-[2-(3-phenylureido)phenyl] benzenesulfonamide.

5. The heat-sensitive recording material according to claim 1, wherein the undercoat layer further contains an inorganic pigment.

6. The heat-sensitive recording material according to claim 5, wherein an oil absorption of the inorganic pigment measured according to a measurement method in Japanese Industrial Standards K-5101 is 90 ml/100 g or more.

7. The heat-sensitive recording material according to claim 5, wherein a content of the inorganic pigment with respect to a total solid content of the undercoat layer is 20 to 70 mass %.

8. The heat-sensitive recording material according to claim 7, wherein the content of the inorganic pigment with respect to the total solid content of the undercoat layer is 40 to 60 mass %.

9. The heat-sensitive recording material according to claim 5, wherein at least one of fired kaolin and silica is contained as the inorganic pigment.

10. The heat-sensitive recording material according to claim 1, wherein a latex is contained as the binding resin.

11. The heat-sensitive recording material according to claim 1, wherein a binding resin having a glass transition temperature of −10° C. or lower is contained as the binding resin.

12. The heat-sensitive recording material according to claim 1, wherein a binding resin having a glass transition temperature of −30° C. or lower is contained as the binding resin.

13. The heat-sensitive recording material according to claim 1, wherein at least a styrene-butadiene-based latex is contained as the binding resin.

* * * * *